(12) United States Patent
Kim et al.

(10) Patent No.: US 7,346,357 B1
(45) Date of Patent: Mar. 18, 2008

(54) FREQUENCY ASSIGNMENT FOR MULTI-CELL IEEE 802.11 WIRELESS NETWORKS

(75) Inventors: Byoung-Jo J. Kim, Jersey City, NJ (US); Kin K Leung, Edison, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/717,366

(22) Filed: Mar. 13, 2007

Related U.S. Application Data (63) Continuation of application No. 11/237,337, filed on Sep. 28, 2005, now Pat. No. 7,206,586, and a continuation of application No. 10/288,041, filed on Nov. 5, 2002, now abandoned.

(60) Provisional application No. 60/337,694, filed on Nov. 8, 2001.

(51) Int. Cl.
 *H04Q 7/20* (2006.01)
(52) U.S. Cl. ............... 455/453; 455/446; 455/447; 455/450; 455/451; 455/452.1
(58) Field of Classification Search ............... 455/453, 455/446, 447, 450, 451, 452.1
 See application file for complete search history.

(56) References Cited

U.S. PATENT DOCUMENTS

| 5,907,544 | A | 5/1999 | Rypinski |
| 5,933,420 | A | 8/1999 | Jaszewski et al. |
| 6,259,898 | B1 | 7/2001 | Lewis |
| 6,345,043 | B1 | 2/2002 | Hsu |
| 6,377,608 | B1 | 4/2002 | Zyren |
| 6,393,261 | B1 | 5/2002 | Lewis |
| 6,694,141 | B1* | 2/2004 | Pulkkinen et al. ......... 455/454 |
| 6,697,013 | B2* | 2/2004 | McFarland et al. ......... 342/159 |
| 6,798,782 | B1* | 9/2004 | Caronni et al. ............. 370/409 |
| 6,834,045 | B1* | 12/2004 | Lappetelainen et al. .... 370/329 |
| 6,839,331 | B2* | 1/2005 | Rudnick ..................... 370/312 |
| 6,922,557 | B2* | 7/2005 | Fantaske .................... 455/403 |
| 7,206,586 | B2* | 4/2007 | Kim et al. .................. 455/450 |
| 7,230,940 | B2* | 6/2007 | Fantaske .................. 455/432.1 |
| 2001/0028639 | A1 | 10/2001 | Eikelenboom et al. |
| 2002/0045428 | A1 | 4/2002 | Chesson |
| 2002/0060995 | A1 | 5/2002 | Cervello et al. |
| 2002/0061031 | A1* | 5/2002 | Sugar et al. ................ 370/466 |
| 2002/0075941 | A1 | 6/2002 | Souissi et al. |

(Continued)

FOREIGN PATENT DOCUMENTS

EP 0802695 A2 10/1997

(Continued)

OTHER PUBLICATIONS

Vucetic et al, Implementation and Performance Analysis of Multi-Algorithm Dynamic Channel Allocation in a Wideband Cellular Network, Jun. 23, 1996, Watkins-Johnson Company.*

(Continued)

*Primary Examiner*—Jean Gelin
*Assistant Examiner*—Huy D Nguyen (57) ABSTRACT

A frequency planning method for use in an IEEE 802.11 wireless network is described. The frequency planning method obtains traffic load information associated with access points belonging to a multi-cell wireless network and assigns channels to the access points based on the traffic load information.

5 Claims, 4 Drawing Sheets

U.S. PATENT DOCUMENTS

| | | | |
|---|---|---|---|
| 2002/0176386 A1* | 11/2002 | Singh .......................... | 370/338 |
| 2003/0076165 A1* | 4/2003 | Furman et al. ............. | 329/304 |
| 2003/0176200 A1* | 9/2003 | Harrison .................... | 455/500 |
| 2003/0219002 A1* | 11/2003 | Kishida ...................... | 370/338 |
| 2004/0077354 A1* | 4/2004 | Jason et al. ................. | 455/450 |
| 2004/0141522 A1* | 7/2004 | Texerman et al. .......... | 370/466 |
| 2006/0120336 A1* | 6/2006 | Fantaske .................... | 370/338 |
| 2006/0133342 A1* | 6/2006 | Zeng ........................... | 370/346 |
| 2006/0291413 A1* | 12/2006 | Rossier et al. .............. | 370/329 |

FOREIGN PATENT DOCUMENTS

| | | |
|---|---|---|
| EP | 1111843 A2 | 6/2001 |

OTHER PUBLICATIONS

Gerald Cervello, Sunghyun Choi, Stefan Mangold and Amjad Soomro, Dynamic Channel Selection (DCS) Scheme for 802.11, Jul. 12, 2000, pp. 1-7, Philips Research, Briarcliff Manor NY.

Jelena Vucetic, Paul Kline, Implementation and Performance Analysis of Multi-Algorithm Dynamic Channel Allocation in a Wideband Cellular Network, Jun. 23, 1996, Watkins-Johnson Company.

European Search Report, EP 02 10 2551, Aug. 21, 2001.

Javier del Prado, Sunghyun Choi, Experimental Study on Co-existence of 802.11b with Alien Devices, Proc. IEEE VTC'01=Fall, Altantic City, USA, Oct. 2001.

* cited by examiner

FREQUENCY ASSIGNMENT FOR MULTI-CELL IEEE 802.11 WIRELESS NETWORKS

CROSS REFERENCE TO RELATED APPLICATIONS

This application is a continuation of Ser. No. 11/237,337 filed Sep. 28, 2005 now U.S. Pat. No. 7,206,586. This application claims the benefit of Ser. No. 10/288,041, filed Nov. 5, 2002 now abandoned, and U.S. Provisional Appl. Ser. No. 60/337,694 filed Nov. 8, 2001, which is incorporated herein by reference in its entirety for all purposes.

BACKGROUND

The invention relates to frequency planning for wireless networks.

To meet the growing demand for wireless data services, many companies have started deploying wireless local area networks (WLANs) in airports, hotels, convention centers, coffee shops and other locations in which network access by the public is desirable. Many of these WLANs support the popular IEEE standard for wireless Local Area Network (LAN) protocol, known as the IEEE 802.11 standard. The IEEE 802.11 standard includes a medium access control (MAC) layer and several physical layers, including a frequency-hopping spread spectrum (FHSS) physical layer and a direct sequence spread spectrum (DSSS) physical layer. Versions of the IEEE 802.11 standard include the IEEE 802.11a standard, which describes a physical layer based on orthogonal frequency division multiplexing (OFDM), and the IEEE 802.11b standard, which specifies a high-rate DSSS layer. Because of its maturity and low cost, IEEE 802.11b capability has been included as standard equipment in many laptop computers and hand-held devices. Thus, IEEE 802.11b products make up the bulk of the installed base of IEEE 802.11 systems. The IEEE 802.11 WLANs support data rates up to 11 Mbps, albeit over short ranges, far exceeding that to be offered by the third generation (3G) cellular wireless networks.

The IEEE 802.11 WLANs and 3G networks (or conventional cellular wireless networks) have major differences in their design at physical (PHY) and medium access control (MAC) layers to meet different needs. In general, the IEEE 802.11 design is much simpler than that of the 3G network because the IEEE 802.11 standard was devised to serve a confined area (e.g., a link distance of at most several hundred meters) with stationary and slow-moving users, while the 3G specifications were developed for greater flexibility in terms of geographical coverage and mobility, even providing for users traveling at a high speed. As a result, the IEEE 802.11 network can support data rates higher than those by the 3G networks. In addition, the cost of IEEE 802.11 equipment is much lower than that for 3G equipment because of the simple and open design of IEEE 802.11 networks, coupled with competition among WLAN vendors.

In terms of operations, the 3G spectrum (such as the Personal Communications System (PCS) band at 1.9 GHz) is licensed and very expensive. As a result, every effort has been directed toward optimizing the spectral efficiency while maintaining the quality of service in terms of coverage and data rate for a limited spectrum allocation. In contrast, the IEEE 802.11b networks operate in the unlicensed Industrial, Scientific and Medical (ISM) band at 2.4 GHz. Since the frequency band is free, there is apparently no pressing need to optimize the spectral efficiency. Rather, simplicity and achieving low cost for the equipment are more important. Despite the relatively abundant spectrum (i.e., a total of 75 MHz in the 2.4 GHz Band) at the ISM band, as IEEE 802.11b networks are deployed widely, they start to interfere with each other. Such interference leads to a degradation in network throughput.

Frequency planning, i.e., allocation of a limited number of frequencies, for an IEEE 802.11b network is different from that for a traditional cellular network. Frequency planning techniques for cellular wireless networks are well known. In typical cellular wireless networks, such as those based on the Global System for Mobile Communications (GSM) and Enhanced Data GSM Evolution (EDGE) standards, two separate radio channels, namely the traffic and control channels, are used to carry user data and control traffic, respectively. For example, terminals access the control channels to send control information via some contention mechanism. After the information is successfully received and processed by a base station (BS), the terminal is assigned with a specific traffic channel for transmitting its data traffic. Existing frequency assignment or radio-resource allocation schemes were devised mainly for such traffic channels. Such schemes seek to avoid mutual interference among various terminals or BSs using the same frequency. In practical networks, there is no real-time coordination among BSs in the assignment of traffic channels to terminals in different cells. Thus, frequency assignment or radio-resource allocation is based on statistical averages or worst cases, e.g., 90% chance of acceptable link quality, across multiple co-channel cells. Typically, frequency planning mechanisms for traditional cellular networks tend to assign the same frequency to cells that are a sufficient distance apart.

There is no such distinction between control and traffic channels in the IEEE 802.11b network. Instead, all user data and control information (in both directions between terminals and APs) are carried on the same physical channel. The access to the channel by multiple transmitters is coordinated by the MAC protocol, e.g., the well-known, Carrier Sense Multiple Access (CSMA) protocol with collision avoidance feature. Under that protocol, a transmitter can transmit only if it senses that the channel is currently idle. As a result, even if two closely located APs are allocated with the same frequency channel, much of the mutual (co-channel) interference can still be avoided by the CSMA protocol, and the available bandwidth is shared implicitly between the two cells served by the two APs. In a sense, the MAC protocol provides an effective, distributed mechanism to "coordinate" the channel access among terminals and APs. In the worst case, both APs behave as if they share the same frequency. Nevertheless, the IEEE 802.11 protocol still works properly, thus demonstrating the robustness of its design, at the expense of increased delay (due to backoff when sensing channel busy) and degraded network throughput.

Consequently, existing frequency allocation mechanisms that do not consider the combined effect of physical channel and MAC protocol are not directly applicable to the IEEE 802.11 networks. The MAC CSMA protocol helps to avoid much of co-channel interference in large multi-cell IEEE 802.11 networks, but does so at the potential expense of network performance.

SUMMARY

The invention provides for frequency planning in wireless networks. Traffic load information is obtained for access points belonging to a multi-cell wireless network. Channels are assigned to the access points based on the traffic load information.

Embodiments of the invention may include one or more of the following features.

The channels may be assigned by determining, for each access point, at least one set of interferers from among the other access points relative to the access point. The at least one set of interferers may be determined by determining, for each of the other access points, if any co-channel interference by the other access point is greater than or equal to a detection threshold and, if it is determined that the co-channel interference is greater than or equal to the detection threshold, identifying the other access point as belonging to the set of interferers for the access point. The detection threshold is indicative of a busy channel according to the CSMA protocol.

The co-channel interference may be derived from values of signal path loss between the access point and the other access point and transmission power of the other access point.

Particular implementations of the invention may provide one or more of the following advantages. The frequency planning mechanism serves as a valuable tool for frequency planning of large-scale multi-cell IEEE 802.11 WLANs by focusing on interactions among devices such as access points based on their traffic loads and radio propagation. Thus, collision of signals in a frequency band that would otherwise occur among the APs are minimized or avoided while throughput of information is optimized. The frequency planning tool can be deployed in a number of different applications, e.g., as part of managed wireless LAN services for business customers or, alternatively, as part of an access point product for an automatic and adaptive frequency planning.

Other features and advantages of the invention will be apparent from the following detailed description and from the claims.

DETAILED DESCRIPTION

Figure 1:
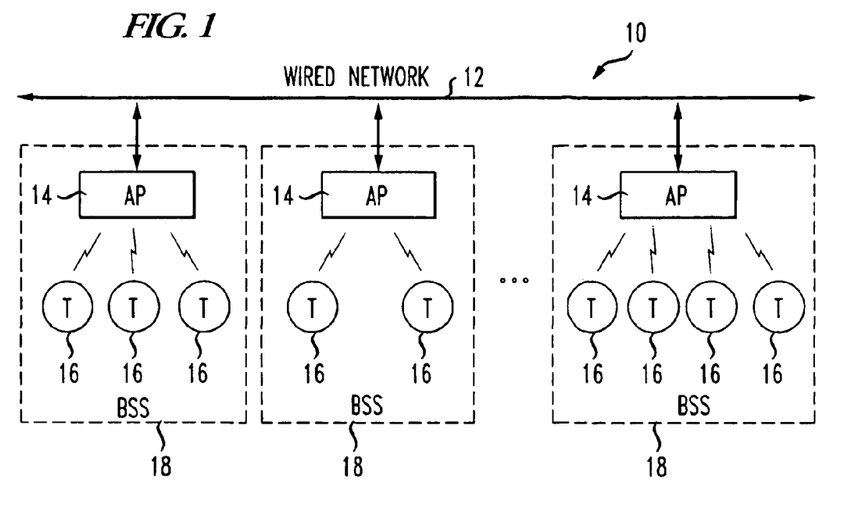
FIG. 1 is block diagram of a wireless network having multiple access points (APs).

Referring to FIG. 1, a wireless network 10 includes a wired network 12 (e.g., a Local Area Network or "LAN") having multiple wireless access points 14 coupled thereto. The network 10 further includes wireless stations or terminals 16 associated with the different APs 14 to form infrastructure basic service structures (or cells) 18. The AP 14 and terminals 16 served by that AP 14 (collectively referred to as a "cell") in a given infrastructure basic service set (BSS) 18 communicate with each other over a common channel that is assigned to the AP. In the embodiment described herein, the AP 14 and terminals 16 communicate with each other according to the wireless protocol provided by the IEEE 802.11 standard. The IEEE 802.11 standard specifies the medium access control (MAC) and the physical (PHY) characteristics for WLANs. The IEEE 802.11 standard is defined in International Standard ISO/IEC 8802-111, "Information Technology-Telecommunications and Information Exchange Area Networks," 1999 Edition, which is hereby incorporated by reference in its entirety. The APs 14 thus provide for communications between the terminals 16 and any devices that may be connected to the wired network 12.

Adjacent access points (APs) in IEEE 802.11 networks can be assigned with the same channel or frequency, which is shared by those APs and their associated terminals according to the multiple access protocol (MAC), namely, the Carrier Sensing Multiple Access with Collision Avoidance (CSMA/CA) protocol. Although the CSMA/CA protocol can coordinate the bandwidth sharing of the same radio frequency in IEEE 802.11 networks, traffic load for the APs has to be considered so that there is enough link capacity for the expected traffic load.

In accordance with the present invention, therefore, the network 10 employs a frequency planning mechanism that considers the combined effects of radio propagation, the IEEE 802.11 MAC protocol and traffic load, so as to mitigate the impact of co-channel interference on the performance of an IEEE 802.11 network.

Figure 2:
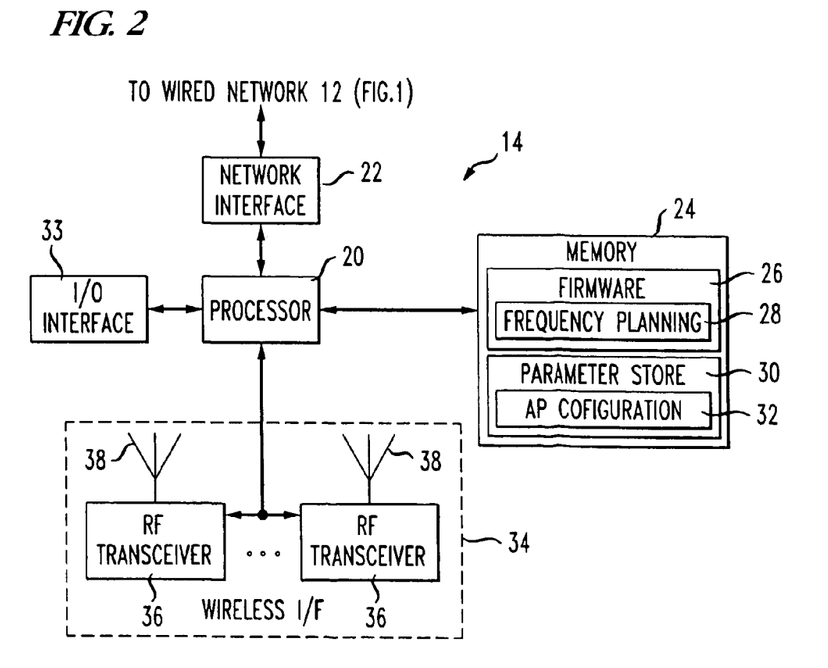
FIG. 2 is a block diagram showing an internal architecture of an AP configured with a tool for performing a frequency assignment process.

Referring to FIG. 2, an exemplary AP 14 is shown. The AP 14 includes a processor 20, coupled to the network 12 by way of a network interface 22. The network interface 22 permits the processor 20 to send and receive units of data, such as packets, over the network 12 using conventional techniques. The processor 20 is also coupled to memory 24. The memory 24 stores firmware 26 that, when executed by the processor 20, causes the access point 14 to operate as described herein. In particular, when the AP 14 is designated to serve as a "master" AP, the firmware 26 includes a frequency planning (or assignment) process 28 that allows the AP 14 to generate channel assignments for all of the APs 14 in the network 10. In an alternative embodiment, with appropriate synchronization, each AP 14, with its own copy of the frequency assignment software, could perform the process to determine channel assignment in a distributed manner. Also stored in memory 24 is a parameter store 30 which stores, among other information, AP configuration 32, including channel assignment information and possibly AP traffic load information and radio parameter data. The AP 14 can also include an I/O interface 33 to allow the AP to be connected to other peripherals.

It will be appreciated that the functionality of the AP 14 may reside in a computer system such as a PC or workstation, with a user interface for manually configuring the access point with information, e.g., channel assignment, or, in the case of the AP running the channel assignment process 28, parameter data to be used by the channel assignment process, or can be connected to a management console for such purpose.

Alternatively, the entire channel assignment process can be installed and executed on a separate system such as a network management system. Once the network management system or AP responsible for the channel assignment has generated the assignment information, AP configuration information including the channel assignment can be provided to the APs over the network, or the APs can be configured with the appropriate channel assignment manually.

The process 28 can be implemented as an automated process that is performed when an initial site "layout" is being defined. At such a stage, the process runs after some pre-determined time interval during which initial loading information is collected. Preferably, it can execute whenever an access point joins or is removed from the network, or whenever AP loading conditions have changed.

The AP 14 includes a wireless interface 34 that includes one or more wireless transceivers 36. In the described embodiment, the transceivers 36 are radio frequency (RF) transceivers. Typically, each transceiver 36 includes its own receiver for receiving wireless RF communications from a terminal, a transmitter for transmitting wireless RF communications to a terminal, and a microprocessor to control the transceiver. Wireless communications are received and transmitted by the transceivers 36 via respective antennas 38, which are connected to the transceiver. Each of the transceivers 36 and antennas 38 are conventional in configuration and operation.

Frequency planning for IEEE 802.11 networks has two distinct characteristics. First, according to the spectrum allocation in North America, there are three overlapping channels for allocation in the IEEE 802.11b networks and eight overlapping channels for IEEE 802.11a networks. Thus, one has to adopt a tight frequency reuse strategy for the 802.11 networks.

The original IEEE 802.11 specification allows for several different kinds of physical layers, including direct sequence spread spectrum (DSSS), frequency hopping spread spectrum (FHSS) and infrared (IR). In particular, the DSSS design supports data rates of 1 and 2 Mbps. Subsequently, while maintaining backward compatibility to the DSSS 802.11, the IEEE 802.11b was adopted to support data rates of 5.5 and 11 Mbps, operating in the 2.4 GHz ISM band. As a result, the IEEE 802.11b network can support 1, 2, 5.5 and 11 Mbps, depending on radio conditions. Another extension is IEEE 802.11a, which uses a different physical layer known as orthogonal frequency division multiplexing (OFDM) to support data rates ranging from 6 to 54 Mbps, operating in the 5.5 GHz band (the U-NII band).

Although the channel assignment technique of the process 28 is described with respect to IEEE 802.11b networks, it will be understood that the technique can be applied to other IEEE 802.11-based networks as well. The IEEE 802.11 MAC protocol supports the independent basic service set (IBSS), which has no connection to wired networks (i.e., an ad-hoc wireless network), as well as an infrastructure BSS, which includes an AP connecting to a wired network (as shown in FIG. 1). While the present invention also applies to the IBSS case, only the infrastructure BSS will be considered.

A brief description of the IEEE 802.11 MAC protocol follows. The IEEE 802.11 specification defines five timing intervals for the MAC protocol. Two of them are considered to be basic ones that are determined by the physical layer: the short interframe space (SIPS) and the slot time. The other three intervals are defined based on the two basic intervals: the priority interframe space (PIFS) and the distributed interframe space (DIFS), and the extended interframe space (EIFS). The SIFS is the shortest interval, followed by the slot time. The latter can be viewed as a time unit for the MAC protocol operations, although the IEEE 802.11 channel as a whole does not operate on a slotted-time basis. For IEEE 802.11b networks (i.e., with a DSSS physical layer), the SIFS and slot time are 10 μs and 20 μs, respectively. The PIFS is equal to SIFS plus one slot time, while the DIFS is the SIFS plus two slot times. The EIFS is much longer than the other four intervals and is used if a data frame is received in error.

The IEEE 802.11 MAC supports the Point Coordination Function (PCF) and the Distributed Coordination Function (DCF). The PCF provides contention-free access, while the DCF uses the carrier sense multiple access with collision avoidance (CSMA/CA) mechanism for contention-based access. The two modes are used alternately in time.

The DCF operates as follows. An AP (or station) with a new packet ready for transmission senses whether or not the channel is busy. If the channel is detected idle for a DIFS interval (i.e., 50 μs for IEEE 802.11b networks), the AP starts packet transmission. Otherwise, the AP continues to monitor the channel busy or idle status. After finding the channel idle for a DIFS interval, the AP: a) starts to treat channel time in units of slot time, b) generates a random backoff interval in units of slot time, and c) continues to monitor whether the channel is busy or idle. In the last step, for each slot time where the channel remains idle, the backoff interval is decremented by one. When the interval value reaches zero, the AP starts packet transmission. During this backoff period, if the channel is sensed busy in a slot time, the decrement of the backoff interval stops (i.e., is frozen) and resumes only after the channel is detected idle continuously for the DIFS interval and the following one slot time. Again, packet transmission is started when the backoff interval reaches zero. The backoff mechanism helps avoid collision since the channel has been detected to be busy recently. Further, to avoid channel capture, an AP must wait for a backoff interval between two consecutive new packet transmissions, even if the channel is sensed idle in the DIFS interval.

The IEEE 802.11 standard requires a receiver to send an acknowledge message (ACK) for each packet that is successfully received. Furthermore, to simplify the protocol header, an ACK contains no sequence number and is used to acknowledge receipt of the immediately previous packet sent. That is, APs and stations exchange data based on a stop-and-go protocol. The sender is expected to receive the ACK within the 10 μs SIFS interval after the packet transmission is completed. If the ACK does not arrive at the sender within a specified ACK—timeout period, or it detects transmission of a different packet on the channel, the original transmission is considered to have failed and is subject to retransmission by the backoff mechanism.

In addition to the physical channel sensing, the IEEE 802.11 MAC protocol implements a network allocation vector (NAV), whose value indicates to each station the amount of time that remains before the channel will become idle. All packets contain a duration field and the NAV is updated according to the field value in each decoded packet, regardless of the intended recipient of the packet. The NAV is thus referred to as a virtual carrier sensing mechanism. The MAC uses the combined physical and virtual sensing to avoid collision.

The protocol described above is called the two-way handshaking. In addition, the MAC also contains a four-way protocol that requires the transmitter and receiver to exchange Request-to-Send (RTS) and Clear-to-Send (CTS) messages before sending actual data, as a way to resolve the so-called hidden terminal problem.

The available number of non-overlapping channels for IEEE 802.11 WLAN systems depends on the underlying PHY layer. In North America, the ISM band at 2.4 GHz is divided into eleven channels for the IEEE 802.11 network where adjacent channels partially overlap each other. Nevertheless, among these eleven channels, there are three completely non-overlapping ones, separated by 25 MHz at their center frequency. In principle, all eleven channels are available for allocation in a given IEEE 802.11 network. However, it may be that overlapping channels can cause enough interference that it is not beneficial to assign overlapping channels to APs. Therefore, only the assignment of non-overlapping channels is considered. The approach to frequency planning described herein can be extended to the allocation of overlapping channels with proper weighting of the overlapped spectrum, proportional to their overlaps, however.

The frequency assignment process 28 described herein focuses on transmission by the APs because the bandwidth consumption for downlink (i.e., from AP to terminal) transmission is much higher than that for uplink (i.e., from terminal to AP) transmission for typical office environment and Internet applications.

The frequency assignment process 28 takes into account the radio-path signal loss between every pair of APs in the network 10 and uses that information to define sets or classes of interferers for each i-th AP (or "$AP_i$"). Based on the interferer classification and the expected traffic utilization (load) associated with each AP, the effective channel utilization as seen by each AP can be determined. The effective channel utilization represents the sum of the traffic load of the AP and that "induced" by its interferers because of channel sensing. In one embodiment, the problem of frequency planning is formulated as a non-linear zero-one integer programming problem, where one of the objective functions is to minimize the effective utilization of the "bottleneck" channel (i.e., the AP with the most highly loaded channel). A heuristic algorithm is used to solve the problem.

For a network having M APs, indexed from 1 to M, and in accordance with the CSMA protocol, an AP with traffic ready for transmission determines if the assigned channel (frequency) is busy or idle. For example, if the AP detects that the received power of co-channel interference is equal to or greater than a channel-busy detection threshold $\alpha$ (in units of mW), which corresponds to about −80 dBm in the IEEE 802.11b standard, the channel is considered to be busy. Otherwise, it is idle.

It is possible that the channel busy status is due to a single transmitting AP or a group of multiple APs transmitting simultaneously. For efficient frequency assignment, the interferers for each AP can be classified as follows. Specifically, for each $AP_i$, $C_i(1)$ denotes a set of interfering APs where transmission by any one AP in the set can cause enough interference for $AP_i$ to detect channel busy. The APs in the set $C_i(1)$ are called class-1 interferers for $AP_i$. Likewise, $C_i(2)$ denotes a set of pairs of two interfering APs where transmission by any pair of APs in the set can cause $AP_i$ to sense channel busy. The APs in $C_i(2)$ are referred to herein as class-2 interferers. It can be noted that transmissions by any single AP in $C_i(2)$ are not sufficient to cause $AP_i$ to sense channel busy. Further, the APs in any AP pair in $C_i(2)$ are not class-1 interferers to each other.

Figure 3:
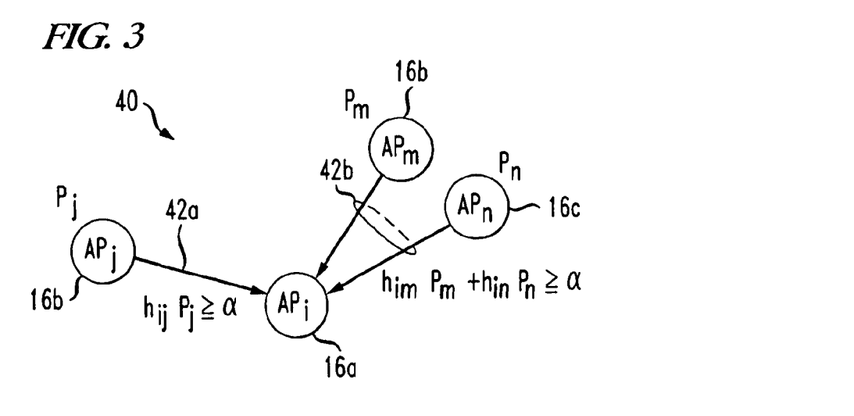
FIG. 3 is an illustration of different classes of co-channel interferer APs relative to a given AP.

Referring to FIG. 3, an example of interferer class definition 40 for a given AP is shown. The $C_i(1)$ and $C_i(2)$ interferers for each $AP_i$ 16a can be determined by measuring or estimating signal path loss between each pair of APs in the network. Letting $P_j$ and $h_{ij}$ denote the transmission power at $AP_j$ 16b and the signal path loss from $AP_j$ to $AP_i$, respectively, the classification of $AP_j$ 16b as a $C_i(1)$ interferer requires that $$h_{ij}P_j \geq \alpha. \qquad \text{Eq. (1)}$$

where $h_{ij}P_j$ represents, for $AP_i$, the co-channel interference contributed by $AP_j$, (indicated in the figure by reference numeral 42a) and $\alpha$ is the power threshold to detect channel busy.

Similarly, where $P_m$ and $P_n$ denote the transmission power at $AP_m$ 16b and $AP_n$, 16c, respectively, and $h_{im}$ and $h_{in}$ denote the signal path loss from $AP_m$ 16b to $AP_i$ 16a and $AP_n$, 16c to $AP_i$ 16a, respectively, the pair $AP_m$ and $AP_n$ belongs to $C_i(2)$ if $$h_{im}P_m + h_{in}P_n \geq \alpha. \qquad \text{Eq. (2)}$$

where $h_{im} P_m + h_{in} P_n$ represents the co-channel interference of the AP pair $AP_m$ and $AP_n$ (indicated in the figure by reference numeral 42b).

It is assumed the transmission power in Equations (1) and (2) is fixed in this disclosure. However, the channel assignment mechanism could be adapted to support dynamic power control as well.

It is possible to define class-3 or even higher classes of interferers as well. Due to the contention-oriented nature of the CSMA protocol, however, the traffic load on each channel (i.e., the probability of transmission at a given AP) cannot be too high. Thus, the probability of having interferers of class-3, which require simultaneous transmission at all three interfering APs, is much smaller relative to that of the class-1 and class-2 interferers. Hence, for simplicity, only class-1 and class-2 interferers are considered by the process 28. The process 28 also takes into account AP traffic load, denoted generally by $\rho$.

Measurement of known RF parameters such as transmission power and signal path loss can be carried out by a dedicated hardware device, such as a handheld measurement device, or a site survey software tool running on a network manager console or PC, or even on the AP device itself. Many wireless LAN equipment vendors bundle such tools with their access point hardware. Traffic load can also be measured or modeled by commercially available network management software.

Once measured, modeled or estimated, such parameter data (measurements or estimates, as discussed above) is stored in the memory 24 for use by the process 28.

There are a total of N (non-overlapping) channels, indexed by 1 to N, available for allocation. As pointed out above, N=3 for the IEEE 802.11b network for non-overlapping channels. With such a small N, it is assumed that each AP is assigned one and only one channel. An effective channel utilization $U_i$ is defined as the fraction of time at which the channel can be sensed busy or is used for transmission by $AP_i$. That is, $$U_i = \rho_i + \sum_{k=1}^{N} X_{ik} \left[ \sum_{j \in Ci(1)} \rho_j X_{jk} + \sum_{(m,n) \in Ci(2)} \rho_m \rho_n X_{mk} X_{nk} \right]. \qquad \text{Eq. (3)}$$

where assignment indicator (or weight) $X_{ij}$ is equal to '1' if $AP_i$ is assigned with channel$_j$ and is equal to '0' otherwise.

Referring to Equation (3) above, the first term $\rho_i$ is the offered traffic load for $AP_i$ in terms of channel utilization without interference from any source. The first summation term inside the brackets in Equation (3) represents the total traffic load of all class-1 interfering APs that are assigned the same channel as $AP_i$. As discussed earlier, according to the CSMA protocol and because of the detection threshold $\alpha$ in use, $AP_i$ senses channel busy when any one of its class-1 interferers transmits on the same channel. The last summation term in Equation (3) represents the total traffic load of all class-2 interferers. The interferer classes can be defined to include overlapping channels as well. For example, the transmission power from interferers on overlapping channels can be weighted proportionally to the spectrum overlap. The weight for non-overlapping channels is '0', and for fully overlapping co-channel cases is '1'. Partially overlapping ones are somewhere in between depending on their carrier frequency offset, filter shapes and other factors.

Channel stability is maintained (i.e., all traffic can be sent eventually) by requiring that $$U_i < S \qquad \text{Eq. (4)}$$

for all $AP_i$ where i=1 to M, and a threshold S is equal to a value of 1. The value of S can be made less than 1 to account for overhead of CSMA contention or other source of interference.

One objective function for the channel assignment is to minimize the effective utilization of the "bottleneck" AP, that is, $$\text{minimize max } \{U_1, U_2, \ldots, U_m\} \qquad \text{Eq. (5)}$$

over the assignment indicator $\{X_{ij}\}$ subject to the constraints of Equation (4) for all i=1 to M. Clearly, the objective function in Equation (5) is to assign channels such that the effective utilization of the most heavily loaded AP is minimized. This results in more resources available for the most heavily loaded AP, given offered traffic loads.

In one embodiment, for the channel assignment process 28 with Equation (5) as the objective function, a heuristic algorithm is utilized, as described below with reference to FIG. 4. Thus, the heuristic algorithm attempts to minimize the effective channel utilization for the bottleneck AP. The heuristic algorithm makes use of the following parameters: offered traffic load $p_i$ and interferer sets $C_i(1)$ and $C_i(2)$ for each $AP_i$. Preferably, the process 28 is subject to constraints of Equation (4) for all APs.

Figure 4:
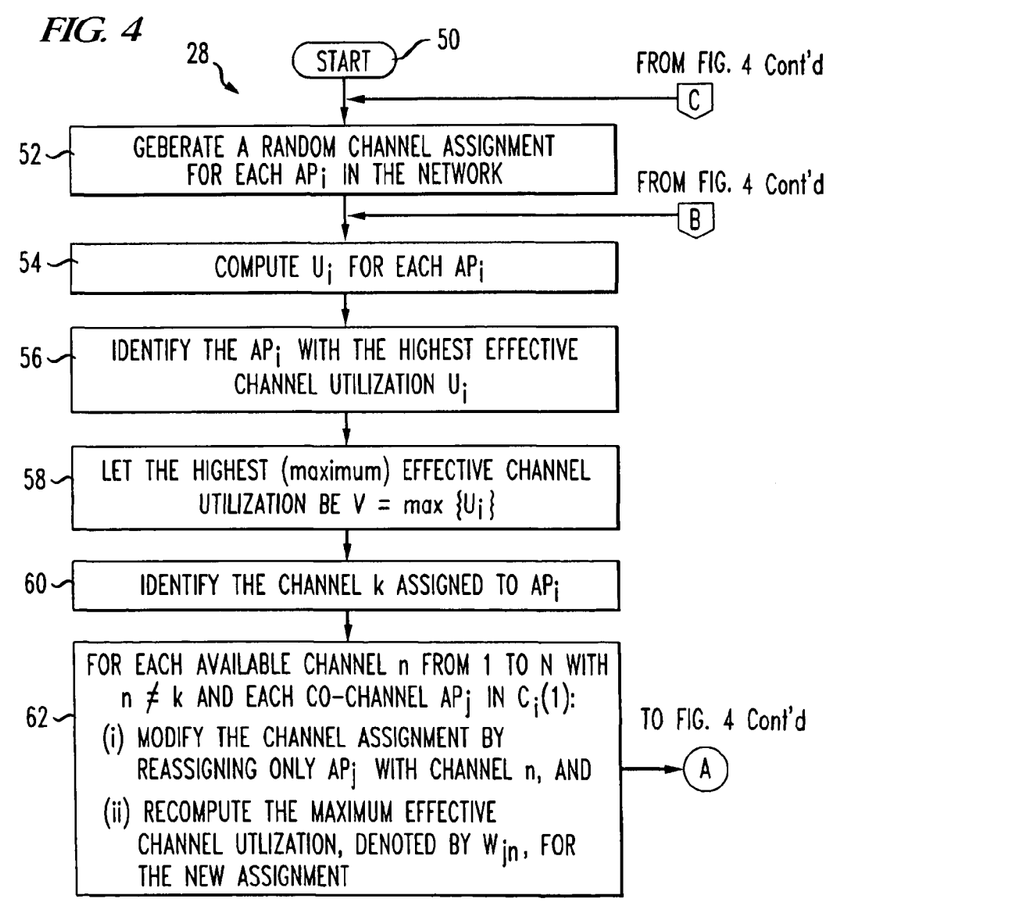
FIG. 4 is a flow diagram of one exemplary embodiment of the frequency assignment process (of FIG. 2).

Referring to FIG. 4, the process 28 begins (step 50) by generating a random (initial) channel assignment for each $AP_i$ in the network (step 52). This assignment is treated as the best assignment obtained so far. The process 28 determines the effective channel utilization $U_i$ for each $AP_i$ based on the generated channel assignment (step 54). The process 28 identifies the AP (say, the "i-th" AP, or $AP_i$) with the highest or maximum effective channel utilization (step 56). This AP is referred to as the "bottleneck" AP. The maximum effective channel utilization, that is, max $\{U_i\}$, for the assignment is denoted by V (step 58). In case of a tie, one such $AP_i$ is chosen randomly as the "bottleneck." For the bottleneck $AP_i$, the process 28 identifies its current assigned channel, say channel k (step 60). For each available channel n from 1 to N with n≠k and each co-channel AP (say j) in $C_i(1)$ (i.e., those APs in the set that have been assigned with channel k), the process 28 temporarily modifies the channel assignment by reassigning only $AP_j$ with channel n, and recomputes the maximum effective channel utilization, denoted by $W_{jn}$, for the new assignment (step 62). After completing such testing for all such n and j, the process 28 determines the minimum, denoted by W, from among all the $W_{jn}$'s (step 64). The process 28 compares the values of W and V (step 66). If the process 28 determines that the value of W is less than that of V, then the process 28 replaces V by W, records the associated new assignment as the "new" best solution (i.e., to finalize the channel change for one AP that minimizes the objective function the most)(step 70), and returns to step 54. If, at step 72, the process 28 determines that W and V are equal, then, with a pre-specified probability $\delta$, preferably in the range $1 > \delta > 0$ (to avoid infinite looping, as discussed later), the process 28 replaces V by W, records the new assignment as the best solution (step 74) and returns to step 54. If the process 28 determines that W is greater than V, the process 28 saves the current assignment and associated V value as the best solution obtained so far (that is, the current assignment is the local suboptimal assignment) (step 76). The process 28 determines if there is another random assignment to be considered (step 78). If so, the process 28 returns to step 52 to repeat the processing for another random assignment. If no further random assignments are to be considered, the process 28 selects a final assignment as the best solution, that is, it is the channel assignment with the lowest value of V, among the local suboptimal assignments reached at step 76 (step 80). The process 28 tests the final solution to determine if constraints of Equation (4) for all APs are satisfied for the final assignment (step 82). If so, the final assignment is feasible. Otherwise, it is considered that no feasible solution exists for the network under consideration. After the feasibility is tested, the process 28 terminates (step 84).

While the process 28 as illustrated in FIG. 4 may not explicitly consider the constraints of Equation (4), minimizing the maximum $U_i$ implicitly enhances the chance of satisfying constraints of Equation (4) for all APs.

There are several characteristics of the heuristic assignment technique that are worth further consideration. First, it can be shown that the heuristic assignment technique has a loop-free property, that is, with $1 > \delta > 0$ in step 74 (FIG. 4), the heuristic algorithm does not have infinite looping. The proof is as follows. Given that the number of AP's M and available channels N in the system are finite, steps of identifying the bottleneck AP and determining W can be completed in a finite amount of time. The only possibility that the algorithm has an infinite loop is that the steps of processing a random assignment are executed repeatedly without stop. Assume, preliminarily, that such looping can occur, that the V value after the m-th execution (iteration) is denoted by $V_m$, and that $\delta=0$ in step 74. To form the infinite looping requires that $V_1 > V_2 > \ldots > V_m$ with m increasing towards infinity. With both M and N being finite, there are only a finite number of all possible channel assignments. Since each new assignment finalized by step 70 has a unique maximum effective channel utilization, it is thus impossible that m goes to infinity. That is, step 76 must be reached after a finite amount of processing.

Now assume that infinite looping is possible with $1 > \delta > 0$. Based on the above argument, it is necessary to have $V_1 > \ldots > V_i = V_{i+1} > \ldots > V_j = V_{j+1} > \ldots V_m$ with m going to infinity for some i and j. Since the argument above has already ruled out the possibility of having subsequences of $V_i$'s of infinite length between two '=' signs on this list, it must contain an infinite number of '=' signs. Since each '=' sign corresponds to an execution of the case of W=V with probability $\delta$, the probability of executing this step for an infinite number of times is thus zero. Hence, the infinite looping cannot exist.

Although it is possible to treat the case of W=V as reaching a local optimum (like the case of W>V), numerical experience suggests that the case of W=V helps explore various assignments for enhanced results, especially when there are multiple bottleneck APs for the channel assignment under consideration.

Since heuristics is involved in the process 28 for the exemplary algorithm illustrated in FIG. 4, achieving the optimal solution is not guaranteed. It is possible, however, to quantify the quality of the suboptimal solution generated by the algorithm. It is observed that the processing—in particular, steps 60, 62 and 64 (FIG. 4)—basically tests out various channel assignments to identify a better solution. As the algorithm is executed for a given initial, random assignment, it is possible to let $Y_0, Y_1, Y_2, \ldots, Y_m$, denote the (random) sequence of the maximum effective channel utilization associated with the channel assignments under testing by step 62, with $Y_0$ denoting the quantity for the initial, random assignment. Based on the $Y_i$ sequence, another sequence $Z_0, Z_1, Z_2, \ldots, Z_n$ is constructed as follows: (i) initialize with $Z_0=Y_0$ and set i=0; (ii) for each j=1, 2, . . . , m, compare $Y_j$ with $Z_i$; and (iii) if $Z_i>Y_j$, then set i=i+1 and $Z_i=Y_j$; otherwise, repeat (ii) for the next j value.

In essence, the sequence $Z_i$ is constructed by examining $Y_j$ one by one, starting with $Z_0=Y_0$ and adding $Y_j$ as the last element in the $Z_i$ sequence only if $Y_j$ is less than $Y_i$ for all i<j (or equivalently, $Y_j$ is less than $Z_i$, the last element in the current sequence). Clearly, the sequence $Z_i$ is monotonic strictly decreasing. Physically, $Z_i$ represents the sequence of the maximum effective channel utilization for an improved assignment finalized by step 70, or step 74 (FIG. 4) that yields a maximum utilization lower than any assignments examined by the algorithm so far in the search process.

The algorithm is repeated for a given number (say K) of initial random assignments. For each initial assignment, one such sequence $Z_i$ (as discussed above) can be obtained. It can be noted that the sequences associated with different initial assignments have different lengths and are mutually independent of each other (although elements in the same sequence are dependent). Furthermore, when the algorithm eventually stops, it is assumed that it has encountered a total of n improved assignments (i.e., improved over those examined earlier and derived from the same initial assignment), which is the sum of lengths of the sequences of $Z_i$ minus K.

One can view that the maximum effective channel utilization for all possible assignments for the given network has a probability distribution. Allowing $T_\pi$ to be the maximum utilization for the top-$\pi$-fraction of assignments (e.g., the top 0.001 percentile assignments), a random assignment with its maximum utilization $Z_0$, gives $$P[Z_0 \leq T_\pi] = \pi \qquad \text{Eq. (6)}$$

It can be proven that, if the algorithm has encountered a total of n improved assignments at the completion of its execution, then $$Q_\pi > 1-(1-\pi)^{n+1} \qquad \text{Eq. (7)}$$

where $Q_\pi$ denotes the probability that the final suboptimal solution generated by the algorithm falls within the top-$\pi$-fraction of assignments. The proof is as follows.

First, the case of encountering n improved assignments for one initial, random assignment is examined. By definition, $$Q_\pi = P\left[\min_i Z_i \leq T_\pi\right] = 1 - P\left[\min_i Z_i > T_\pi\right]. \qquad \text{Eq. (8)}$$

The event of (min $Z_i>T_\pi$) in the above is identical to having $Z_0>T_\pi, Z_1>T_\pi, \ldots,$ and $Z_n>T_\pi$. Given that $Z_i$ is a strictly decreasing (random) sequence, then $$P[Z_0>T_\pi \wedge Z_1>T_\pi \wedge \ldots \wedge Z_n>T_\pi]$$

$$<P[Z_0>T_\pi \wedge Z_0^1>T_\pi \wedge \ldots \wedge Z_0^n>T_\pi] \qquad \text{Eq. (9)}$$

where $Z_0^i$ is a random variable independently drawn from the same distribution for $Z_o$ for i=1 to n. One can obtain Equation (9) by replacing $Z_i$ on the left hand side by $Z_0^i$ on the right side for one i at a time. Since the $Z_0^i$ variables are independent, $$P[Z_0>T_\pi \wedge Z_0^1>T_\pi \ldots Z_0^n>T_\pi]=\{P[Z_o>T_\pi]\}^{n+1} \qquad \text{Eq. (10)}$$

Using the definition in Equation (6), substituting Equation (10) into Equation (9) and then Equation (9) into Equation (8) yields Equation (7). The case with multiple initial random assignments is proved by exploiting the property that the sequences $Z_i$ associated with different initial assignments are mutually independent.

The performance of the process 28 is validated by applying the process 28 to two settings of multi-cell networks using the IEEE 802.11 air interface for which the optimal assignment is known. The settings correspond to settings for a seven (7) cell network and thirty-seven (37) cell network.

Figure 5:
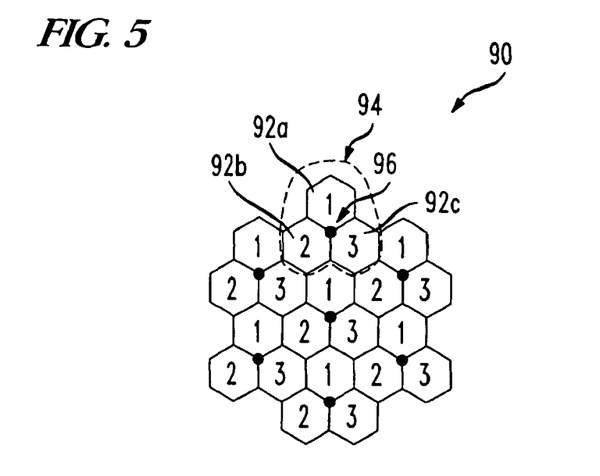
FIG. 5 is an illustration of an exemplary frequency assignment produced by the frequency assignment process (of FIG. 4) for a wireless network with 7 cells and 21 APs.

Referring to FIG. 5, an assignment 90 generated by the process 28 for a setting that corresponds to a network with 7 cells is shown. Three adjacent hexagon-shaped sectors 92a, 92b and 92c form a cell 94. Each sector 92 is served by an AP at the center of the cell. Each AP antenna has a beamwidth of 60' and points toward an appropriate direction to serve the associated sector. Thus, there are 21 APs in the 7 cell network, with 3 APs for each given cell co-located at the cell center, indicated by reference numeral 96.

Figure 6:
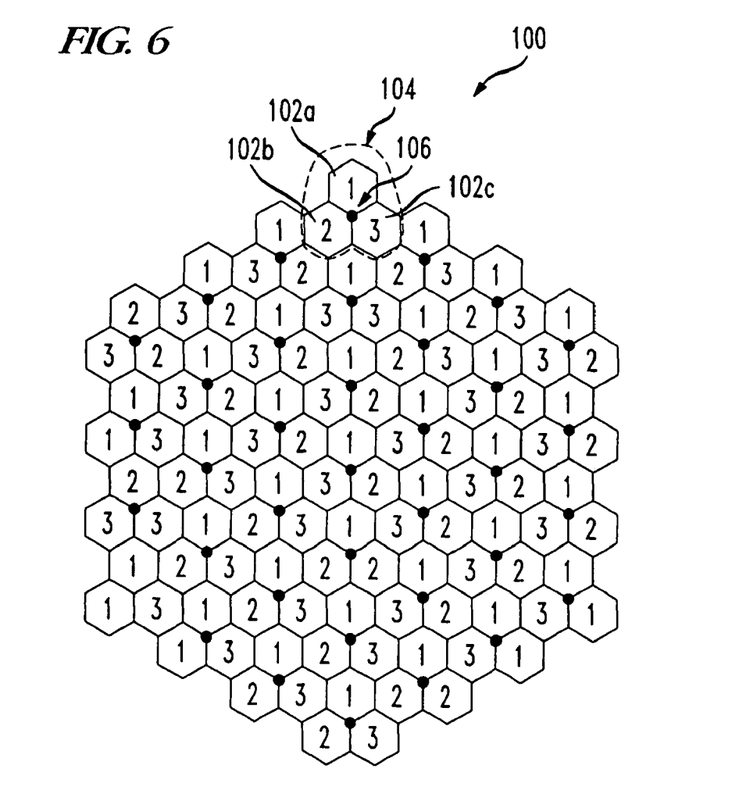
FIG. 6 is an illustration of an exemplary frequency assignment produced by the frequency assignment process (of FIG. 4) for a wireless network with 37 cells and 111 APs.

Similarly, and referring to FIG. 6, an assignment 100 for a setting that corresponds to a network with 37 cells is shown. Three adjacent hexagon-shaped sectors 102a, 102b and 102c form a cell 104. For this setting, there are 111 APs, with 3 APs for each given cell co-located at the cell center, indicated by reference numeral 106.

The antenna gain has a parabolic shape; that is, a 3 dB drop relative to the front direction occurs at the half beamwidth angle. Any direction beyond a threshold angle in clockwise or anti-clockwise direction suffers a given, fixed attenuation relative to the gain at the front direction, which is called the front-to-back (FTB) ratio. The FTB is set to be 25 dB.

It may be recalled that only the AP-to-AP interference is considered in the current formulation. The radio link between any pair of APs in the network is characterized by a path-loss model with an exponential of 3.5. Cell radius is assumed to be 1 Km and the path loss at 100 m from the cell center is −73 dB. Transmission power for each AP antenna is 30 dBm (or 1 W). All APs have an identical amount of offered traffic. It will be noted that the solution generated by the process 28 in this instance does not depend on the actual traffic load, but the feasibility of the final solution does. In order to ensure that the optimal assignment is known, shadowing and fast fading are not considered. In addition, the channel-busy detection threshold α is set to be 2.5e-3 μW (which corresponds to −86 dBm). As pointed out earlier, there are 3-non-overlapping channels available in the ISM band for assignment. Based on the parameter settings for both 7 and 37 cell networks, the optimal assignment is the traditional frequency reuse of 3. That is, no adjacent sectors (APs) use the same channel.

When the process 28 is applied to the network with 7 cells and 21 APs, as shown in FIG. 5, it generates the optimal channel assignment based on 50 random assignments. The optimal assignment 90 with channels 1 to 3 assigned to the various sectors 92a, 92b and 92c for each cell 94 is as shown in FIG. 5.

As for the network with 37 cells and 111 APs, the process 28 was unable to yield the obvious optimal assignment of reuse of 3, that is, without considering the boundary effect of the cell layout (which makes the interference conditions non-uniform). The suboptimal solution for channels 1-3 obtained from the process using 1,000 random assignments is the assignment 100 shown in FIG. 6. It can be seen from the assignment 100 that most of the sectors (APs) use a channel different from those in adjacent sectors. In the worst case, at most two adjacent sectors share the same channel. The process encountered and finalized a total of 505,363 improved assignments. Based on the analysis set forth above, with a probability higher than 99.4%, the suboptimal solution, assignment 100, falls within the top 0.001th percentile. This result is quite acceptable.

The above two examples have uniform traffic load and uniform propagation environments with obvious solutions and are only used to verify the correctness of the algorithm. However, for any wireless network of considerable size, the traffic load and the propagation environment are seldom uniform and are usually without obvious channel assignment solutions. The approach of the frequency planning process 28 can easily produce a good (albeit suboptimal) channel assignment solution in such cases, with provable closeness to the optimal solution. Also, if the traffic load is slowly fluctuating over time, the approach can be used to generate a series of channel assignments over time to best accommodate the changing conditions.

Other objective functions can be used in the channel assignment optimization. For example, another objective function (in addition to objective function of Equation (5)) is to minimize the overall interference, that is, $$\text{minimize} \sum_{i=1}^{M} U_i$$

over the assignment indicator $\{X_{ij}\}$ subject to the constraints of Equation (4) for all i=1 to M. It can be noted that the sum of all $U_i$ reflects the total effective channel utilization. Minimizing the sum tends to minimize the overall interference in the network while maintaining stability of each channel shared and detectable by multiple neighboring APs.

For the optimization with Equation (11) as the objective function, a linear integer programming approach can be used. For a given network setting, the offered load $p_i$ and the interferer sets $C_i(1)$ and $C_i(2)$ for each $AP_i$ are known. The programming problem is non-linear due to the cross-products of $X_{ij}$'s in $U_i$, as defined in Equation (3). Using known techniques—for example, the technique described in the paper by W. W. Chu entitled "Optimal File Allocation in a Multiple Computer System, "*IEEE Trans. On Computers*, C-18, No. 10, pp. 885-889, October 1969—it is possible to linearize the problem by replacing $X_{ik}X_{mk}X_{nk}$ by a new term $Y_{ikmn}$. Similarly, the term $X_{ik}X_{jk}$ is replaced by a new term $Z_{ikj}$. The resultant problem becomes a linear integer programming problem, which has been shown to be NP-complete.

Yet another objective function is to maximize network throughput.

Other embodiments are within the scope of the following claims. For example, the above-described approach may be extended to consider one or more of the following: non-uniform transmission power by the APs; upstream traffic; overlapping channels (as discussed earlier); real-time adaptive channel assignment to meet the fluctuation of traffic load at various APs over time; inclusion of path gains for stations; and special frequency constraints for individual AP's (e.g., AP closest to a Microwave, WLANs of other carriers).

The invention claimed is:

1. A method executed in a network management system adapted to work with a network of access points $AP_i$, i=1, 2, ... M, where each $AP_i$ communicates at an assigned frequency with a plurality of terminals, and where the communication between an access point and a terminal employs a protocol that provides contention-based access using a carrier sense multiple access with collision avoidance (CDMA/CA) mechanism, and also provides contentions-free access when the contention-based access is successful, comprising the steps of:

receiving from each APi information about (a) fraction of time that APi is busy, (b) for each possible frequency of operation, k, fraction of time that one or more access points other than APi would interfere with APi if APi were communicating at frequency k, and (c) for each possible frequency of operation, k, fraction of time that one or more pairs of access points, not including APi, would interfere with APi if APi were communicating at frequency k;

developing a measure of effective channel utilization for APi, Ui, operating at frequency 1, in accord with the expression $$U_i = \rho_i + \sum_{k=1} X_{ik} \left[ \sum_{j \in C(1)} \rho_j X_{jk} + \sum_{(m,n) \in C(2)} \rho_m \rho_n X_{mk} X_{nk} \right]$$

where $\rho$ is the fraction of time that AP is active, and $X_{rk}$ is 1 if APr is assigned to operate at frequency k, and is 0 if APr is assigned to operated at a frequency other than k, C(1) is the set of interferers that by themselves contribute an interference level in excess of a preselected threshold, and C(2) is the set of interferer pairs that, as pair, contribute an interference level in excess of the preselected threshold;

creating an assignment of a frequency of operation for each of the access points with an objective function that undertakes to minimize the effective channel utilization of that access point that has a greatest effective channel utilization; and communicating the created assignments to the access points.

2. The method of claim 1 where the objective function is $$\min \max \{U_1, U_2, \ldots, U_M\},$$

and the minimization is carried out over the assignment indicator $X_{rk}$, subject to the constraint that no effective channel utilization by an access point exceeds the total capacity of the access point.

3. The method of claim 1 where the step of creating employs a heuristic algorithm.

4. The method of claim 3 where the algorithm begins with a random channel assignment.

5. The method of claim 4 where, in said algorithm,
(a) effective channel utilizations for each access point is computed,
(b) identify the highest effective channel utilization is, V, the access point with that highest effective channel utilization ($AP_{highest}$), and the frequency assigned to $AP_{highest}$,
(c) assign all other possible other frequencies, one at a time, to $AP_{highest}$, for each assignment re-compute the effective channel utilizations for each access point,
(d) identify, following the re-computing, the a channel assignment with the lowest effective channel utilization, W;
(e) if W is less than V, replace V with W and return to step (c), and if W is not less than V, retain V.

\* \* \* \* \*